(12) United States Patent
Sperlich et al.

(10) Patent No.: US 7,783,263 B2
(45) Date of Patent: Aug. 24, 2010

(54) SIMPLIFIED DIGITAL PREDISTORTION IN A TIME-DOMAIN DUPLEXED TRANSCEIVER

(75) Inventors: Roland Sperlich, Dallas, TX (US); Gregory C. Copeland, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 895 days.

(21) Appl. No.: 11/610,563

(22) Filed: Dec. 14, 2006

(65) Prior Publication Data

US 2008/0144539 A1 Jun. 19, 2008

(51) Int. Cl.
*H04B 7/005* (2006.01)
*H04J 3/00* (2006.01)
(52) U.S. Cl. .................... 455/73; 370/278; 370/280
(58) Field of Classification Search ............... 370/345; 455/73
See application file for complete search history.

(56) References Cited

U.S. PATENT DOCUMENTS

| | | | | |
|---|---|---|---|---|
| 4,616,329 | A * | 10/1986 | Abrams et al. ............... | 702/107 |
| 2002/0173341 | A1* | 11/2002 | Abdelmonem et al. ...... | 455/561 |
| 2003/0137404 | A1* | 7/2003 | Bonneau et al. .......... | 340/10.41 |
| 2008/0144539 | A1* | 6/2008 | Sperlich et al. ............. | 370/278 |

OTHER PUBLICATIONS

"Operation and Performance of the ISL5239 Pre-distortion Linearizer", Application Note AN1022 (Intersil Americas, Inc., 2002).
"Adaptive Predistortion Using the ISL5239", Application Note AN1028 (Intersil Americas, Inc., 2002).
"Digital Predistortion Reference Design", Application Note AN-314-1.0 (Altera Corporation, Jul. 2003).

* cited by examiner

*Primary Examiner*—Kamran Afshar
*Assistant Examiner*—Munsoon Choo
(74) *Attorney, Agent, or Firm*—John J. Patti; Wade J. Brady, III; Frederick J. Telecky, Jr.

(57) ABSTRACT

A transceiver for time-domain duplexed (TDD) communications, for example in connection with wireless broadband data communications, is disclosed. The transceiver includes digital predistortion compensation circuitry, which compensates the digital signals to be transmitted based on feedback signals from the output of the power amplifier, in order to linearize the output from the power amplifier. The feedback signals from the power amplifier are coupled back to the digital predistortion circuitry over part of the same receive path as the received signals from the wireless communications channel. The shared path includes analog-to-digital converters that are used both in the transmit period of the TDD cycle to convert the feedback signals from the power amplifier output, and in the receive period of the TDD cycle to convert the analog received signals.

13 Claims, 5 Drawing Sheets

SIMPLIFIED DIGITAL PREDISTORTION IN A TIME-DOMAIN DUPLEXED TRANSCEIVER

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

This invention is in the field of communications circuitry and systems, and is more specifically directed to digital predistortion techniques in such circuitry and systems.

Wireless data communications have become prevalent in the marketplace over recent years. Wireless access into local area networks (LANs) have become popular in many homes and businesses, especially with advances in higher-speed and longer reach technologies (e.g., according to the recent IEEE 802.11g and 802.11n standards). This trend is continuing, with the development and deployment of wireless broadband access in many locations. Indeed, some cities have recently announced plans to develop and implement municipal wireless broadband access zones within their boundaries. In this regard, the "WiMAX", "WiBro", and IEEE 802.16 wireless broadband access technologies are recent technologies and standards for wireless broadband communications and access.

Wireless transceivers, particularly in the wireless data communications context, of course involve power amplifiers that amplify the modulated signals to a sufficient amplitude to successfully transmit these signals. The high data rates desired for broadband communications, for example as specified in the recent wireless broadband technologies, require these power amplifiers to be highly linear in their amplification (i.e., output voltage vs. input voltage). Unfortunately, linearity is typically difficult to achieve in modern wireless power amplifiers, especially in combination with high efficiency operation. Efficiency is of particular importance in mobile wireless broadband communications, to maximize battery life in wireless handsets and to minimize operational costs for wireless basestations.

Digital predistortion is a known method of compensation for power amplifier non-linearity, while still preserving efficiency in the power amplifier operation. In general, digital predistortion digitally distorts the signal to be applied to the input of the power amplifier, based on measurements at the output of the power amplifier. Typically, correction values are generated, based on measurements from the power amplifier output, and are stored in a look-up table (LUT), typically represented in the form of a programmable non-linearity. Digital values of signals to be transmitted are applied as addresses to the LUT to access these correction values, and the accessed correction values "pre-distort" the signals to be transmitted so that the resulting power amplifier output is linear over its dynamic range.

By way of further background, time-domain duplexing (TDD) is a known technique for carrying out wireless communications, or indeed any communications over a communications medium. TDD simply refers to the division of time periods into transmit and receive periods, such that data travels only in one direction (e.g., client equipment to base station) during one period, and travels only in the opposite direction (e.g., base station to client equipment) during the other period.

FIG. 1 illustrates a conventional wireless transceiver architecture for carrying out communications in a TDD environment, and that includes digital predistortion compensation. In this architecture, baseband processor 2 refers to digital circuitry that receives and processes the digital signals to be transmitted and those received, and as such may be in communication with a host processor (not shown), such as the main CPU in a handheld device such as a cellphone or a personal digital assistant (PDA), or in a portable or other computer system. Baseband processor 2 is typically realized as a digital signal processor (DSP) device, for example the DSPs manufactured and sold by Texas Instruments Incorporated.

On the transmit side, baseband processor 2 communicates a digital datastream corresponding to the signals to be transmitted to digital upconverter 4. Digital upconverter 4 is a conventional circuit function that receives the datastream from baseband processor 4, and processes that datastream into a stream of digital samples at a desired sample rate, generally modulated into in-phase and quadrature-phase components as shown in FIG. 1. Digital upconverter 4 also generally includes digital filter and digital mixer functions, as known in the art. In this conventional architecture, the in-phase and quadrature sample streams are applied to digital predistortion function 6, which compensates these sample streams for non-linearity at the power amplifier, as will be described below. In general, digital predistortion function 6 includes a look-up table (LUT) storing compensation values for each available sample amplitude of the input signal from digital upconverter 4, and circuitry that applies the appropriate compensation value from the LUT to the input samples, thus producing compensated in-phase and quadrature-phase values presented to digital-to-analog converters (DACs) 8I, 8Q, as shown in FIG. 1. DACs 8I, 8Q convert the compensated digital sample streams from digital predistortion function 6 into respective analog signals IF_I, IF_Q at a desired intermediate frequency. These intermediate frequency analog signals IF_I, IF_Q are applied to mixer 10TX, which mixes these signals up to a desired carrier frequency generated by local oscillator 11. The resulting mixed analog signal from mixer 10TX is filtered by band-pass filter 11, and applied to the input of power amplifier 12, which in turn drives the signal to be transmitted via duplexer 14 to antenna A.

On the receive side in this conventional architecture, receive mixer 10RX has an input coupled to duplexer 14, and receives signals from antenna A during receive periods, in this TDD architecture. Receive mixer 10RX downconverts the analog frequency of these received signals, producing phase-separated analog signals IF_I, IF_Q at the desired intermediate frequency determined by local oscillator 11. Analog-to-digital converters (ADCs) 18I, 18Q convert these intermediate frequency analog signals IF_I, IF_Q into digital datastreams corresponding to the in-phase and quadrature-phase components, and apply these converted digital signals to digital downconverter 20. As known in the art, digital downconverter 20 performs such functions as downconversion tuning, programmable delay, channel filtering, and automatic gain control on these converted digital signals, along with demodulation of the two components into a single datastream. The resulting datastream from digital downconverter 20 is applied to baseband processor 2, for processing of the received data as appropriate for the particular application.

As mentioned above, the conventional architecture illustrated in FIG. 1 includes digital predistortion, implemented by digital predistortion circuit function 6, to compensate for non-linearity in power amplifier 12. This compensation is effected by accessing correction values corresponding to the amplitude of the digitally upconverted digital signals, for both the in-phase and quadrature-phase components. According to this conventional architecture, as known in the art, the correction non-linearities, typically stored in a LUT within digital predistortion function 6, are derived from measurements of the signal output by power amplifier 12; these correction values are updated over time, in this conventional architecture.

FIGS. 2a through 2c illustrate the theory of operation of digital predistortion compensation, as known in the art and as realized in digital predistortion circuit function 6 in the system of FIG. 1. FIG. 2a illustrates the ideal linear operation of a power amplifier. As shown in FIG. 2a, output voltage Vout exactly equals the input voltage Vin, multiplied by gain k (i.e., Vout=kVin) Real power amplifiers, such as power amplifier 12 in the transceiver of FIG. 1, do not operate with this ideal characteristic, however. Rather, nonlinearities in the operation of conventional power amplifiers, especially in the wireless environment, tend to flatten out the amplifier gain, with the gain typically saturating at high input voltage levels. FIG. 2b illustrates an example of a power amplifier characteristic, in which the output voltage Vout is not merely the input voltage Vin multiplied by gain k, but also includes a multiplicative non-linear function $f(Vin)$ that is also involved in the determination of the output voltage Vout. This non-linearity, which may be expressed as Vout=$f(Vin)$kVin, is undesirable in transceiver systems, especially in high data rate wireless communications as desired to be carried out by the transceiver of FIG. 1. Digital pre-distortion function 6 therefore applies a corrective factor to the input signals to be amplified, preferably approximating the inverse of the non-linear function $f(Vin)$ applied by power amplifier 12. FIG. 2c illustrates compensated voltage Vcomp as corresponding to inverse function $f^{-1}(Vin)$. It is this compensated voltage Vcomp that is then used as the input to the power amplifier stage, so that the resulting output voltage Vout will in turn be a linear function of the input voltage Vin (i.e., Vout=kVin). By compensating the voltages applied at the input of power amplifier 12 in this manner, the output of power amplifier 12 approaches the ideal characteristic illustrated in FIG. 1a.

As known in the art, the derivation of the compensation applied by digital predistortion function 4 (i.e., the inverse function $f^{-1}(Vin)$ of FIG. 2c) is based on actual measurements at the output of power amplifier 12. This takes into account the actual characteristics of power amplifier 12, and changes in those characteristics over time and over environmental changes (temperature, etc.) of the system. Referring back to FIG. 1, in this conventional architecture, the output of power amplifier 12 is coupled to mixer 10DPD via coupler 13. Mixer 10DPD generates intermediate frequency analog signals IF_I, IF_Q, shifted in frequency based on the reference signal from local oscillator 11, in the known manner. These intermediate frequency analog signals IF_I, IF_Q are converted to digital signal streams by ADCs 16I, 16Q, respectively, and applied to digital predistortion function 6. As known in the art, circuitry or software functionality within digital predistortion function 6 is readily able to derive compensation values based on the measured signals from the output of power amplifier 12, as compared with the corresponding input values generated by digital upconverter 4. In operation, digital predistortion function 6 receives the feedback signal via the loop of mixer 10DPD and ADCs 16 during TDD transmission periods, and uses this feedback to determine and adjust the predistortion correction values.

BRIEF SUMMARY OF THE INVENTION

It is therefore an object of this invention to provide a method and circuitry for efficiently realizing digital predistortion compensation in a time-domain duplexed (TDD) transceiver.

It is a further object of this invention to provide such a method and circuitry that reduces the number of analog-to-digital converters in the transceiver architecture.

It is a further object of this invention to provide such a method and circuitry that can be readily implemented in modern high data rate transceivers.

It is a further object of this invention to provide such a method and circuitry that is compatible with current and future wireless data communication standards.

Other objects and advantages of this invention will be apparent to those of ordinary skill in the art having reference to the following specification together with its drawings.

The present invention may be implemented into a transceiver architecture for a time-domain duplexed (TDD) data communications, in which the main receive path, including analog-to-digital converters (ADCs), is enabled to carry power amplifier feedback signals during transmit periods and received signals during TDD receive periods. During transmit periods, the received signals are converted to digital signals and forwarded to a digital predistortion function, for determination and updating of digital predistortion correction values. During receive periods, the received signals are digitally downconverted and forwarded to baseband processing in the usual fashion.

DETAILED DESCRIPTION OF THE INVENTION

The present invention will be described in connection with its preferred embodiment, namely as implemented into a time-domain duplexed (TDD) transceiver architecture for use in wireless broadband data communications. This specific example is provided in this specification because this invention is contemplated to be especially beneficial when used in such an application. However, it is also contemplated that this invention can also provide important and significant benefits in other systems and applications. Accordingly, it is to be understood that the following description is provided by way of example only, and is not intended to limit the true scope of this invention as claimed.

Figure 3:
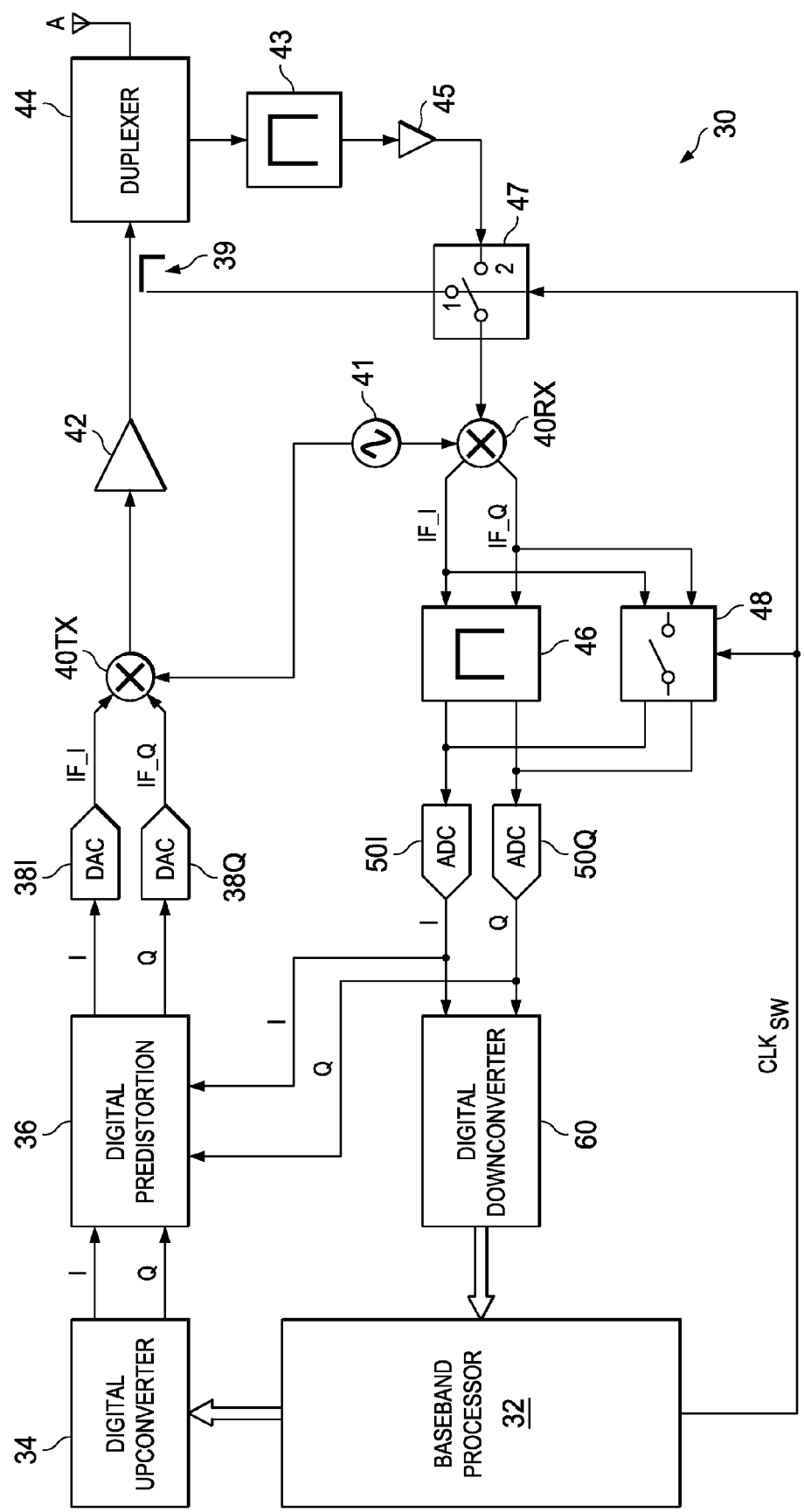
FIG. 3 is an electrical diagram, in block form, of a transceiver architecture that implements digital predistortion compensation according to a first preferred embodiment of the invention.

Referring first to FIG. 3, transceiver 30 constructed according to a first preferred embodiment of this invention will be described. Transceiver 30 may be realized within client equipment, such as a wireless network adapter, wireless telephone handset, personal digital assistant (PDA), handheld computer, or the like; alternatively, the architecture of transceiver 30 may also be implemented into infrastructure equipment, whether deployed at a base station, a central office, or a neighborhood access point or curbside box.

Figure 4:
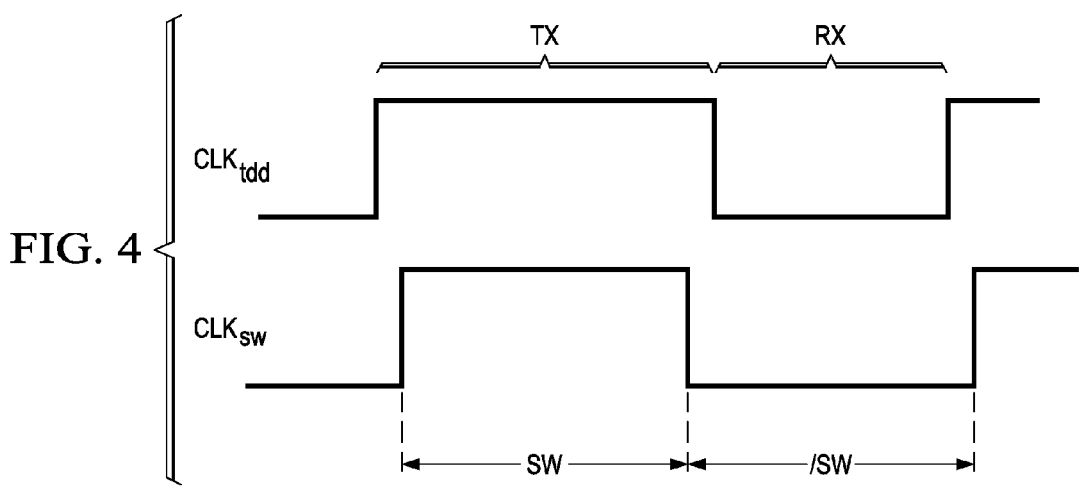
FIG. 4 is a timing diagram illustrating the timing of transmit and receive periods in the time-domain duplexed (TDD) environment, and also the timing of feedback processing during transmit periods, according to the preferred embodiment of the invention.

According to this first preferred embodiment of the invention, transceiver 30 is designed for transmitting and receiving signals in a time-domain duplexed (TDD) communications system or environment. As is fundamental in the art, TDD communications uses a common communications channel (which is wireless in this example, but which may alternatively be a wired channel), in which duplexed (i.e., bidirectional) communications are carried out by time-multiplexing. For example, from the viewpoint of transceiver 30, time periods are defined within which a transmit period (i.e., transmission from transceiver 30) and a receive period (i.e., transmissions to transceiver 30) are also defined. FIG. 4 illustrates periodic clock signal $CLK_{tdd}$, within which a transmit period (TX) and a receive period (RX) are defined. As shown in FIG. 3, the transmit and receive periods need not be symmetrical, and indeed the relative transmit and receive periods may be adjusted dynamically during a communications session to accommodate changes in demand. As such, again from the viewpoint of transceiver 30, transceiver 30 is permitted to transmit signals during transmit period TX, during which time it will ignore any signals it receives (and during which transmissions to transceiver 30 are preferably inhibited at the source, to minimize noise); during receive period RX, transceiver 30 does not transmit any signals but is operable to receive signals over the wireless medium and to process those received signals.

Referring back to FIG. 3, transceiver 30 includes baseband processor 32, as shown. Baseband processor 32 is conventional digital signal processing circuitry that receives and processes the digital signals to be transmitted and the signals that are received. Preferably, baseband processor 32 is realized as a digital signal processor (DSP) device, for example the TMS320TC16482, TMS320TCI100Q, and TMS320TCI100 DSPs manufactured and sold by Texas Instruments Incorporated, such DSPs being particularly well-suited for use in wireless infrastructure applications. Baseband processor 32 may be in communication with a host processor (not shown), such as the main CPU in a handheld device such as a cellphone or a personal digital assistant (PDA) or in a portable or other computer system, or in communication with a host via a router, other communications facilities, and the like. Baseband processor 32 operates in the "baseband", as its digital operations are performed on digital data at its sample frequency, prior to upsampling or modulation.

Figure 1:
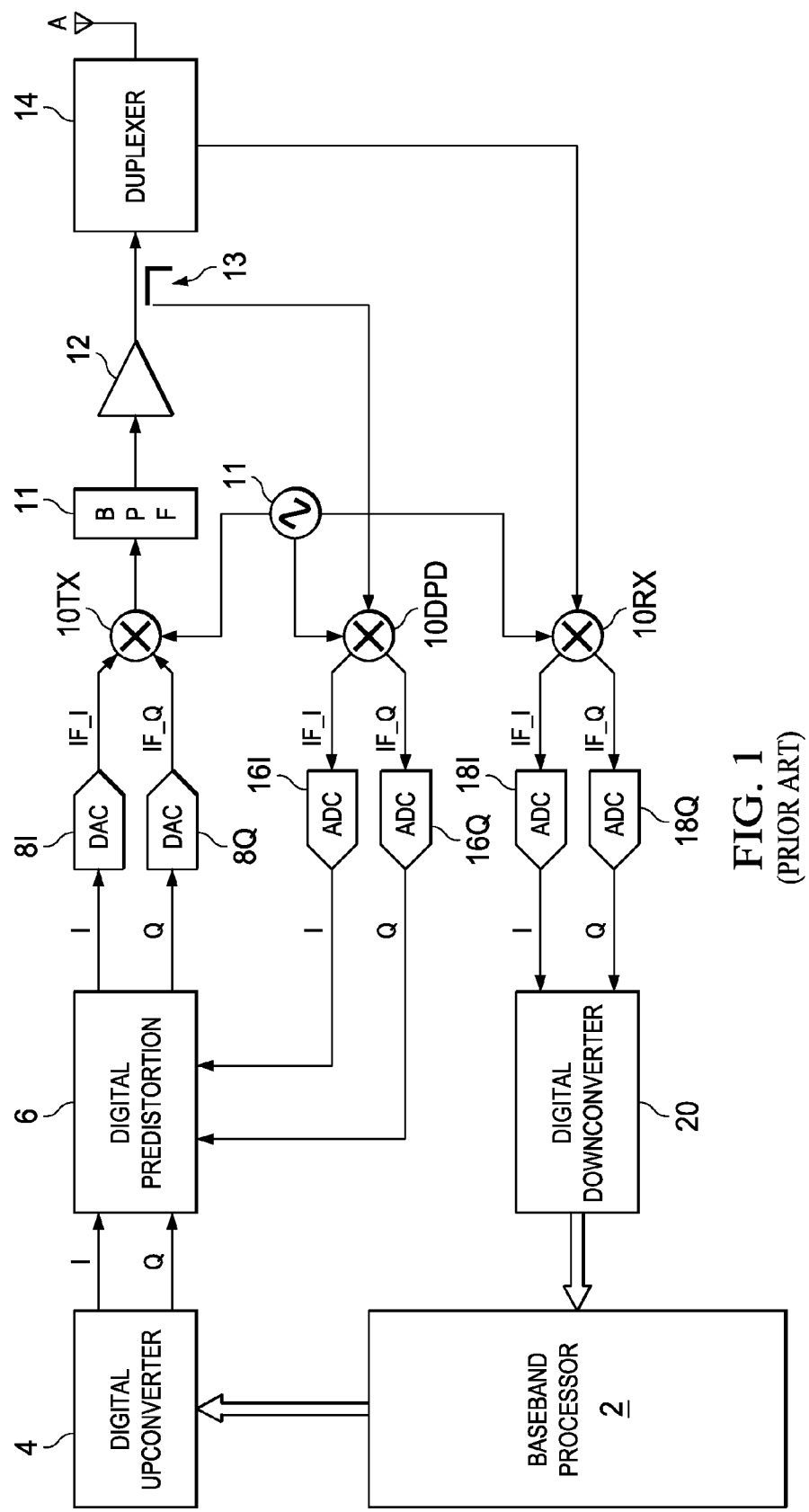
FIG. 1 is an electrical diagram, in block form, of a conventional transceiver architecture that implements digital predistortion compensation.

The transmit side of transceiver 30 is constructed similarly as described above for the conventional architecture of FIG. 1. Baseband processor 32 is coupled to digital upconverter 34, which receives the datastream from baseband processor 32 and that processes the datastream into a stream of digital samples at a desired sample rate. An example of conventional digital upconverter functions suitable for use in transceiver 30 is the GC5016 Wideband Quad Digital Down-Converter/Up-Converter circuit available from Texas Instruments Incorporated; as evident from its datasheet, a single instance of this GC5016 circuit can support two digital up-converter channels and also two digital down-converter channels (including, for example, digital down converter 60 of FIG. 3, described below). In its operation, as known in the art, digital upconverter 34 generally increases the fundamental frequency of the digital datastream presented by baseband processor 32 to a selected intermediate frequency, encodes or modulates the values of the input sample stream into in-phase and quadrature-phase components, and applies digital filter and mixer functions useful for processing the sample stream. In this conventional architecture, digital upconverter 34 converts the input sample stream into in-phase and quadrature-phase sample streams. These in-phase and quadrature-phase sample streams are applied to digital predistortion function 36. Alternatively, depending on the desired modulation of the transmitted signals, digital upconverter 34 may not separate the signals into orthogonal (in-phase and quadrature-phase) components, but may instead present a single signal stream component. This description will refer to the transmitted and received signals as phase-separated into orthogonal components, as it is contemplated that most modern communications of this type will utilize such orthogonal values, but of course those skilled in the art having reference to this specification will realize that the preferred embodiments of this invention can be readily adapted to single-component (i.e., real-valued) signal streams.

Figure 5:
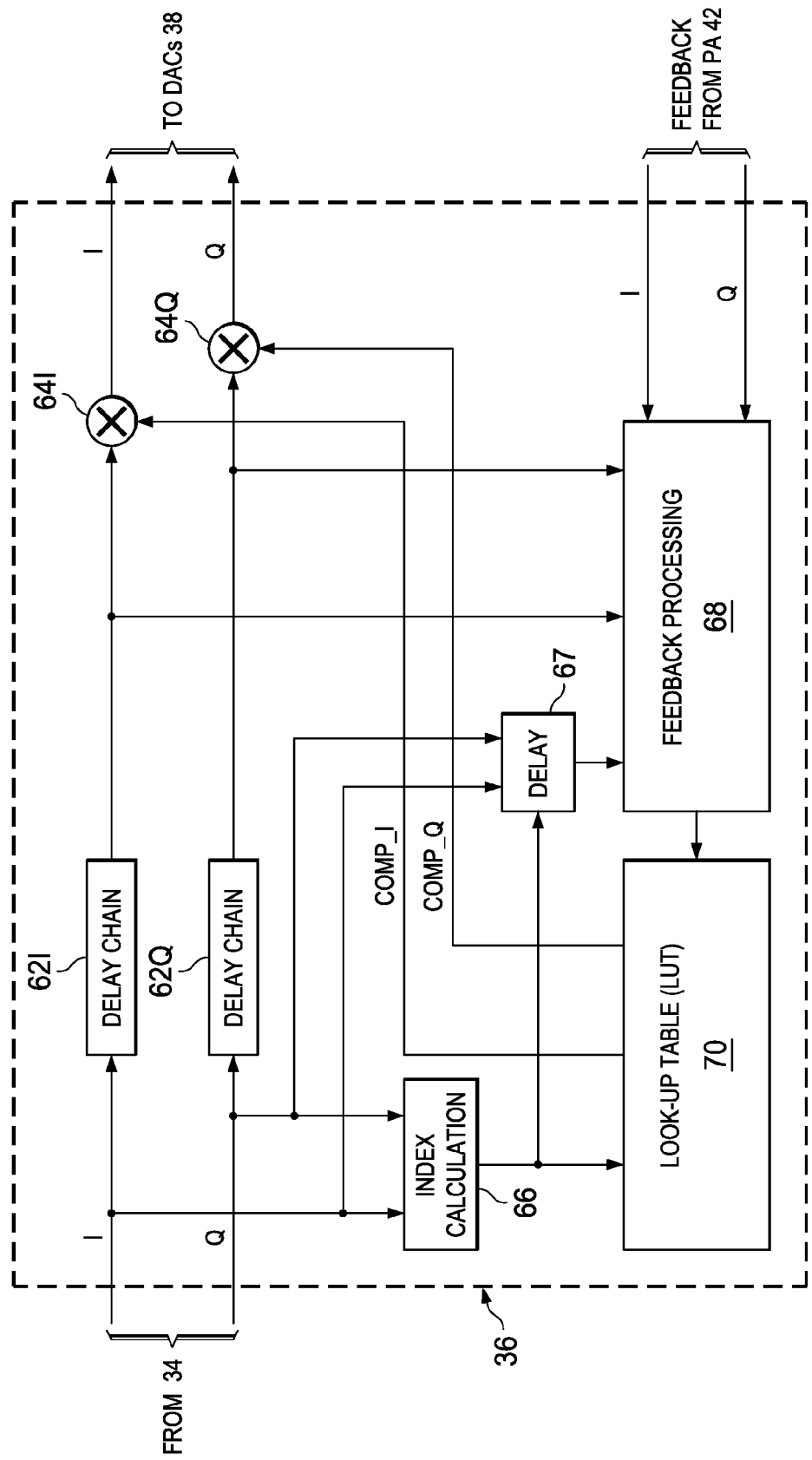
FIG. 5 is an electrical diagram, in block form, of a conventional digital predistortion function as useful in transceiver architectures constructed according to the preferred embodiments of the invention.

According to this preferred embodiment of the invention, digital predistortion is applied to the signal streams to be transmitted to compensate for non-linearity at the transmitter power amplifier 42. In this embodiment of the invention, digital predistortion function 36 is provided to accomplish this function. FIG. 5 illustrates a generic functional architecture for digital predistortion function 36, as known in the art. Further details regarding the operation of digital predistortion function 36 are available in "Operation and Performance of the ISL5239 Pre-distortion Linearizer", Application Note AN1022 (Intersil Americas, Inc., 2002), and in "Adaptive Predistortion Using the ISL5239", Application Note AN1028 (Intersil Americas, Inc., 2002), both incorporated herein by this reference. Of course, it is contemplated that many different approaches to determining, updating, and applying digital predistortion to the transmitted signal streams may alternatively be used. This conventional arrangement of FIG. 5 is provided in this specification to provide the reader with context regarding the operation of digital predistortion compensation, by way of this example.

As shown in the generic architecture of FIG. 5, the digital in-phase and quadrature-phase component signals from digital upconverter 34 are received at inputs of digital predistortion function 36. These input components are forwarded to index calculation function 66, which calculates an address of look-up table (LUT) 70. As mentioned above, LUT 70 stores compensation values associated with the digital values of the input signals; index calculation function 66 translates the digital inputs (in-phase and quadrature-phase components in this implementation) into the appropriate address, so that LUT 70 provides the appropriate compensation values COMP_I, COMP_Q at its outputs. These compensation values COMP_I, COMP_Q are applied to multipliers 64I, 64Q, respectively, which receive the input digital in-phase and quadrature-phase signals, delayed by delay chains 62I, 62Q, respectively, that compensate for the propagation delay of index calculation function 66 and LUT 70. The outputs of multipliers 64I, 64Q are forwarded to DACs 38I, 38Q (FIG. 3), respectively.

Figure 2A:
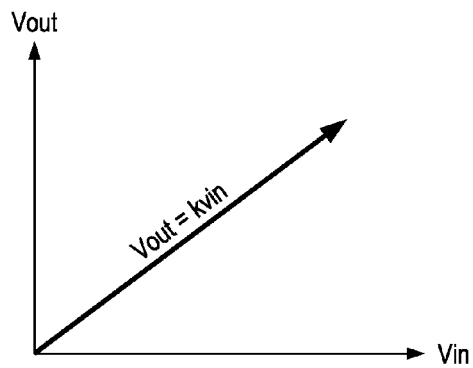
FIGS. 2a through 2c are plots of power amplifier output voltage versus power amplifier input voltage, illustrating the effect of digital predistortion compensation.
Figure 2B:
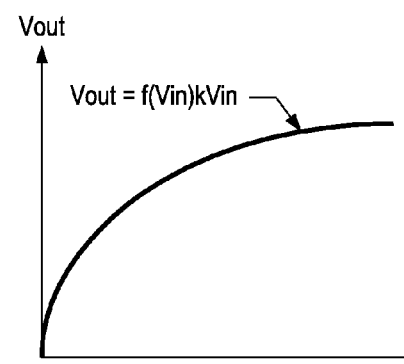
Figure 2C:
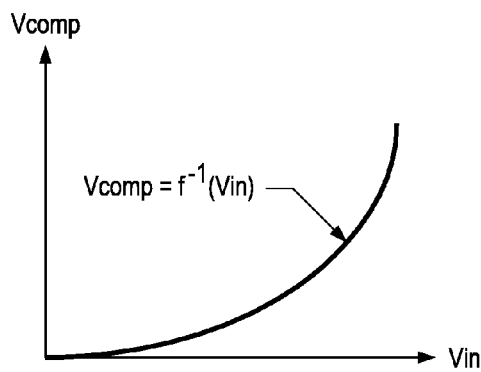

The compensation values stored in LUT 70 are derived by digital predistortion function 36 based upon measurements from the output of power amplifier 42. As shown in FIG. 5, these feedback signals (in-phase and quadrature-phase components), which are representative of the output of power amplifier 42 in response to the input digital values, are applied to feedback processing block 68. Digital values corresponding to the input signals are also applied to feedback processing block 68, delayed by delay stage 67 to account for propagation delay through the remainder of the transmit chain through power amplifier 42, such that feedback processing block 68 receives both the input digital values, and the feedback signals corresponding to those same input digital values. The output of index calculation function 66, delayed by delay stage 67, is also provided to feedback processing block 68. Feedback processing block 68 includes logic circuitry that determines the appropriate compensation factors COMP_I, COMP_Q for compensating the digital input values so that the output from power amplifier 42 linearly follows the amplitude of those signals (see FIG. 2c). These compensation values COMP_I, COMP_Q are forwarded to LUT 70, for storage at the indexed location corresponding to the digital input values.

As evident from this description, compensation factors COMP_I, COMP_Q can be determined initially for transceiver 30, for example upon system power-up. These compensation factors COMP_I, COMP_Q may also be updated to compensate for changes in the operating characteristics of power amplifier 42 and also for changes in the environment in which transceiver 30 is operating. The frequency at which such updating of the compensation values COMP_I, COMP_Q can vary, according to system design or application.

Referring back to FIG. 3, the outputs of digital predistortion function 36 are applied to digital-to-analog converters (DACs) 38I, 38Q. DACs 38I, 38Q convert the compensated in-phase and quadrature-phase digital sample streams into respective analog signals IF_I, IF_Q, each at a desired intermediate frequency. The outputs of DACs 38I, 38Q are coupled to mixer 40TX, which also receives a periodic signal from local oscillator 41. Mixer 40TX generates a combined modulated signal at a desired carrier frequency that corresponds to the difference between the intermediate frequency and the frequency output by local oscillator 41, with the modulated based on the content of intermediate frequency analog signals IF_I, IF_Q, as known in the art. The resulting modulated analog signal at the output of mixer 40TX is applied to the input of power amplifier 42, which amplifies the modulated analog signal for transmission over antenna A. In this preferred embodiment of the invention in which duplexing is carried out in TDD fashion, duplexer 44 couples antenna A to the output of power amplifier 42 and isolates the receive path from antenna A during transmit periods, and couples the receive path to antenna A and isolates the output of power amplifier 42 from antenna A during receive periods.

According to this preferred embodiment of the invention, the receive path is not only used for signal receipt and processing during receive periods in the TDD cycle, but is also used to receive and process feedback signals from power amplifier 42 during transmit periods. As described above, these feedback signals are used to determine and adjust the compensation applied by digital predistortion function 36.

As shown in FIG. 3, the receive path of transceiver 30 begins with duplexer 44, which is coupled to antenna A and which presents an output that is applied to band-pass filter 43. Band-pass filter 43 is a conventional analog filter that eliminates wide-band noise from outside of the frequency band of interest. The output of band-pass filter 43 is coupled via amplifier 45 to an input of switch 47. A second input of switch 47 is coupled to the output of power amplifier 42, via coupler 39. Accordingly, switch 47 selects between the receive path (duplexer 44, band-pass filter 43, and amplifier 45) and the feedback path (power amplifier 42 and coupler 39); as will be described in further detail below, switch 47 is controlled by a control signal $CLK_{sw}$ (generated, for example, by baseband processor 32 or by other control circuitry in transceiver 30) to forward the feedback from power amplifier 42 during the transmit period TX in the TDD cycle.

The output of switch 47, which presents either the feedback signal or the received signal, is applied to an input of mixer 40RX. Mixer 40RX also receives a periodic signal from local oscillator 41, and produces in-phase and quadrature phase signals IF_I, IF_Q at an intermediate frequency, corresponding to a difference in frequency between the carrier frequency of the received or feedback signal and the local oscillator 41 output frequency. To realize this orthogonal component realization, mixer 40RX includes two physical mixers that receive the local oscillator signal at orthogonal phases (one mixer receiving the local oscillator signal at a phase difference of 90° relative to the other), to produce the in-phase and quadrature-phase intermediate phase components. The outputs of mixer 40RX are coupled to inputs of analog-to-digital converters (ADCs) 50I, 50Q through parallel paths, according to this embodiment of the invention. One path couples the outputs of mixer 40RX to ADCs 50I, 50Q through band-pass filter 46, which further reduces out-of-band noise, and as such is contemplated to be useful for additional filtering (beyond that of band-pass filter 44) of the receive signal from antenna A. The other path couples the outputs of mixer 40RX to ADCs 50I, 50Q via switch 48, effectively bypassing band-pass filter 46; as will be described in further detail below, this path is used for forwarding the feedback signal from power amplifier 42 to ADCs 50I, 50Q.

ADCs 50I, 50Q convert the analog intermediate frequency in-phase and quadrature-phase signals IF_I, IF_Q into the digital domain, in the conventional manner. The outputs of ADCs 50I, 50Q are coupled to inputs of digital downconverter 60, and also to inputs of digital predistortion function 36. Digital predistortion function 36 uses these signals from the outputs of ADCs 50I, 50Q, which correspond to digital versions of the output of power amplifier 42, to derive and update the compensation values COMP_Q, COMP_I stored in its LUT 70, as described above. On the other hand, digital downconverter 60 receives and processes the digital signals at the outputs of ADCs 50I, 50Q, in order to recover and convert the digital values received at antenna A, in the conventional manner. As described above, an example of conventional digital downconverter functions suitable for use in transceiver 30 as digital downconverter 60 is the GC5016 Wideband Quad Digital Down-Converter/Up-Converter circuit available from Texas Instruments Incorporated. In its operation, as known in the art, digital downconverter 60 generally converts the fundamental frequency of the digital datastream produced by ADCs 50I, 50Q to a datastream at baseband frequency that can be processed by baseband processor 32. Additional functions performed by digital downconverter 60 can include decoding or demodulating of the separated in-phase and quadrature-phase components, and digital filtering of the sample streams.

In operation, according to this first preferred embodiment of the invention, baseband processor 32, or other circuitry within transceiver 30, controls switches 47, 48 to select between the feedback signal from power amplifier 42 or the signal being received at antenna A, for processing by the common receive path. In this example, switch control signal $CLK_{sw}$ controls the operation of switches 47, 48 within the TDD period in a manner that is substantially synchronized with the transmit and receive periods. FIG. 4 illustrates an example of this operation. Control signal $CLK_{sw}$ is driven by baseband processor 32 or other control circuitry to state SW during the transmit period TX of the TDD cycle. As shown in FIG. 4, there is preferably a slight delay between the beginning of transmit period TX (i.e., the rising edge of clock signal $CLK_{tdd}$) and the time at which control signal $CLK_{sw}$ is driven to state SW. The time at which control signal $CLK_{sw}$ is driven back to state /SW (i.e., NOT SW) preferably leads the end of transmit period TX and beginning of receive period RX (i.e., the falling edge of clock signal $CLK_{tdd}$) by a small interval.

In response to control signal $CLK_{sw}$ being in state SW, according to this preferred embodiment of the invention, switch 47 is in position 1 to select the output of power amplifier 42 to be applied to the input of mixer 40RX, and switch 48 is closed to bypass band-pass filter 46, coupling the outputs of mixer 40RX to ADCs 50I, 50Q directly (i.e., without additional filtering). With switches 47, 48 in this position, the output of power amplifier 42 is fed back to mixer 40RX, converted to intermediate frequency in-phase and quadrature-phase analog signals IF_I, IF_Q, and converted to the digital domain by ADCs 50I, 50Q, respectively; digital predistortion function 36 can now respond to these digital feedback signals from power amplifier 42 to derive and update the compensation values stored in its LUT 70.

According to this embodiment of the invention, the bypassing of band-pass filter 46 by switch 48 is preferred, because some of the non-linear distortion resulting from power amplifier 42 is contemplated to be present at frequencies outside of the receive band of interest. As such, it is preferred to compensate for this out-of-band distortion by way of digital predistortion function 36, and therefore this out-of-band distortion is preferably not filtered out from the feedback signal. Digital predistortion function 36 can thus adjust its compensation values in response to this out-of-band distortion.

Conversely, in response to control signal $CLK_{sw}$ in its /SW state, switch 47 is in position 2, selecting the receive signal as presented at the output of amplifier 45 for application to mixer 40RX, and switch 48 is opened. In this state, which corresponds to receive period RX in the TDD cycle (FIG. 4), the signal received at antenna A is forwarded to mixer 40RX via band-pass filter 44, amplifier 45, and switch 47. Mixer 40RX converts this received analog signal into intermediate frequency in-phase and quadrature-phase components IF_I, IF_Q, in the manner described above, and each of these component signals are band-pass filtered by analog band-pass filter 46 to remove additional out-of-band noise (for example as may be caused by amplifier 45 or other circuitry in the receive path, or as may have been incompletely filtered by filter 44). These filtered intermediate frequency in-phase and quadrature-phase components IF_I, IF_Q are then converted into the digital domain by ADCs 50I, 50Q, respectively, and applied to digital downconverter 60. The digital signal output by digital downconverter 60 is then forwarded to baseband processor 32, for digital signal processing and other operations, including forwarding to the host system as appropriate for the particular application of transceiver 30. Digital predistortion function 36 is controlled to not update its compensation values during this time, considering that no input digital signals are being processed for transmission during this receive period RX.

According to this preferred embodiment of the invention, therefore, significant efficiencies are provided in the construction and operation of a TDD transceiver. Analog-to-digital converters are relatively complicated circuits, especially when operating on high data rate signal streams as will be encountered in communications applications, especially applications such as wireless broadband communications. As such, the integrated circuit chip area required to realize modern high-precision ADCs is substantial. According to the preferred embodiment of the invention, the feedback and receive paths share the same ADCs. As such, the manufacturing cost required to realize a TDD transceiver is greatly reduced, with no loss in precision (indeed, with perhaps an increase in precision made available because only one path's ADCs are now required, freeing additional chip area for the realization of these circuits). This improved efficiency is provided with minimal change in the performance or fidelity of the transceiver circuitry.

Figure 6:
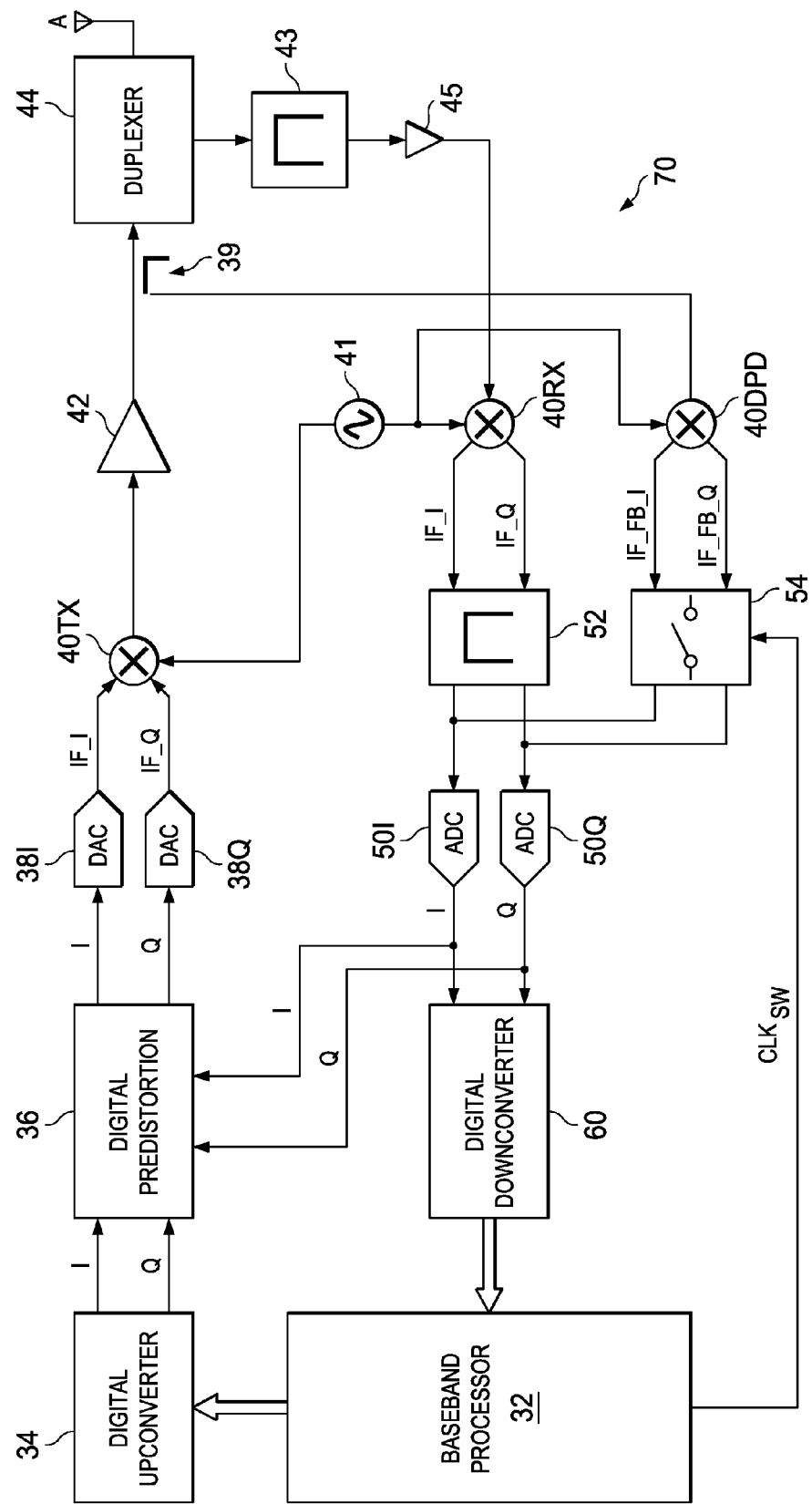
FIG. 6 is an electrical diagram, in block form, of a transceiver architecture that implements digital predistortion compensation according to a second preferred embodiment of the invention.

Referring now to FIG. 6, transceiver 70 according to a second preferred embodiment of the invention will now be described. This embodiment of the invention is particularly useful for those design and manufacturing technologies in which analog mixer circuits are less costly than high-performance switches, as compared with the first embodiment of the invention shown in FIG. 3 and described above.

The transmit side of transceiver 70 is constructed identically as that in transceiver 30 described above relative to FIG. 3, and as such will not be described again here. On the receive side, duplexer 44 is connected to band pass filter 43, which is a conventional analog filter that eliminates wide-band noise in the signals received at antenna A that is outside of the frequency band of interest. The output of band-pass filter 43 is coupled to amplifier 45, the output of which is connected to mixer 40RX. Mixer 40RX receives a periodic signal from local oscillator 41 at orthogonal phases in this example, and produces intermediate frequency in-phase and quadrature-phase components IF_I, IF_Q, modulated by the received signal. The outputs of mixer 40RX are connected to second band-pass filter 52, which filters out-of-band noise from intermediate frequency in-phase and quadrature-phase components IF_I, IF_Q (including such out-of-band noise that may have been produced by amplifier 45). The outputs of band-pass filter 52 are connected to the outputs of ADCs 50I, 50Q, which convert the analog domain intermediate frequency in-phase and quadrature-phase components IF_I, IF_Q into the digital domain, for forwarding to digital downconverter 60 and baseband processor 32, as before. In this second preferred embodiment of the invention, therefore, no switch for selecting between the feedback and receive signals is present in the receive path between antenna A and digital downconverter 60.

The feedback path from power amplifier 42 connects to mixer 40DPD, via coupler 39. Mixer 40 DPD is an analog mixer, receiving a periodic signal from local oscillator 41, to produce an intermediate frequency signal based on the difference between the carrier frequency output by power amplifier 42 and the frequency of the periodic signal from local oscillator 41. In this preferred embodiment of the invention, in which the signal values are complex and as such include orthogonal components, mixer 40 DPD includes two mixers that receive orthogonal phases (one 90° out of phase relative to the other) of the periodic signal from local oscillator 41. Mixer 40DPD produces the intermediate frequency in-phase and quadrature-phase analog feedback signals IF_FB_I, IF_FB_Q, which are coupled to switch 54. Switch 54 operates to selectively connect and isolate the outputs of mixer 40DPD from the inputs to ADCs 50I, 50Q. The output of ADCs 50I, 50Q are connected to digital predistortion function 36, as described above, for determination and adjustment of the digital predistortion compensation values based on these feedback signals from power amplifier 42.

It is useful to isolate the feedback path from the inputs to ADCs 50I, 50Q during receive periods RX in the TDD cycle, to reduce noise and interference in the received signal. As such, switch 54 is controlled by control signal $CLK_{sw}$ to be open during receive periods RX of the TDD cycle (FIG. 4), and to be closed during transmit periods TX. As described above and as illustrated in FIG. 4, it is preferred to briefly delay the closing of switch 54 from the beginning of the transmit period TX, and to slightly advance the opening of switch 54 from the beginning of the receive period RX, to ensure that receive signals and noise at the TDD transitions are not included in the derivation and adjustment of the digital predistortion compensation values.

According to this second preferred embodiment of the invention, therefore, the important benefit of sharing the ADCs in the receive path with the feedback path for derivation and adjustment of digital predistortion compensation is provided. As a result, transceiver cost can be substantially reduced, with minimal adverse impact on transceiver performance. Furthermore, this second preferred embodiment of the invention can save additional cost, particularly for those technologies in which mixer circuits are relatively inexpensive, from a chip area or circuit complexity standpoint, as compared with high-performance switches. In addition, the receive path does not include a series switch for purposes of switching feedback signals in and out, and as such it is contemplated that this second preferred embodiment of the invention can provide a cleaner receive signal to the ADCs, as compared with the first preferred embodiment of the invention. The elimination of this series switch may be important in some applications and system environments.

In each of these first and second preferred embodiments of the invention, local oscillator 41 is shared by the transmit, receive, and digital predistortion mixers 40TX, 40RX, 40DPD. If desired, separate dedicated local oscillators may be provided for one or more of these mixer functions. However, it is preferred that the same local oscillator be used for transmit mixer 40TX and digital predistortion mixer 40DPD, so that any phase noise added by transmit mixer 40TX from the local oscillator signal will be subtracted by digital predistortion mixer 40DPD, using the same local oscillator signal. In this way, phase noise will not influence the digital predistortion compensation values.

In addition, in each of these first and second preferred embodiments of the invention, an additional band-pass filter 46, 52 is provided for the receive signal. Inclusion of this additional filter is preferred, as mentioned above, for example to eliminate out-of-band noise produced in the receive path itself, or to sharpen the characteristic of the pass-band. However, this additional band-pass filter may be omitted if desired, if the primary band-pass filter 43 is sufficient to filter out-of-band noise from the receive signal.

It is contemplated that these and other alternatives in the realization of this invention will be apparent to those skilled in the art having reference to this specification. Therefore, while the present invention has been described according to its preferred embodiments, it is of course contemplated that modifications of, and alternatives to, these embodiments, such modifications and alternatives obtaining the advantages and benefits of this invention, will be apparent to those of ordinary skill in the art having reference to this specification and its drawings. It is contemplated that such modifications and alternatives are within the scope of this invention as subsequently claimed herein.

What is claimed is:

1. A transceiver for time-domain duplexed (TDD) communications comprising:
a baseband processor;
digital predistortion (DPD) circuit that is coupled to the baseband processor;
a digital-to-analog converter (DAC) that is coupled to the DPD circuitry;
a local oscillator;
a first mixer that is coupled to the DAC and the local oscillator;
a power amplifier that is coupled to the mixer;
receiver circuitry that is coupled to the power amplifier, wherein receiver circuitry includes a filter;
a second mixer that is coupled to the local oscillator and at least a portion of the receiver circuitry;
an analog-to-digital converter (ADC) that is coupled to the second mixer, the baseband processor, and the DPD circuitry, wherein the filter is coupled between the second mixer and the ADC; and
a switch that is substantially in parallel to at least a portion of the receiver circuitry between the power amplifier and the ADC, wherein the switch is actuated so as to provide an output from the power amplifier to the ADC during transmit periods of a TDD cycle, and wherein the switch is actuated so as to isolate the output from the ADC during receive periods of the TDD cycle.

2. The transceiver of claim 1, wherein the transceiver further comprises:
a digital downconverter that is coupled between the ADC and the baseband processor; and
a digital upconverter that is coupled between the baseband processor and the DPD circuitry.

3. The transceiver of claim 1, wherein the switch further comprises:
a first switch that is coupled to the power amplifier and is coupled between at least a portion of the receiver circuitry and the second mixer; and
a second switch that is coupled in parallel to the filter between the mixer and the ADC.

4. The transceiver of claim 3, wherein the filter further comprises a first filter, and wherein the receiver circuitry further comprises:
a duplexer that is coupled to the power amplifier;
a second filter that is coupled to the duplexer; and
an amplifier that is coupled between the second filter and the first switch.

5. A transceiver for TDD communications comprising:
a baseband processor;
digital predistortion (DPD) circuit that is coupled to the baseband processor;
a digital-to-analog converter (DAC) that is coupled to the DPD circuitry;
a local oscillator;
a first mixer that is coupled to the DAC and the local oscillator;
a power amplifier that is coupled to the mixer;
receiver circuitry that is coupled to the power amplifier;
a pair of second mixers that are each coupled to the local oscillator, wherein a first one of the pair of second mixers is coupled between first and second portions of the receiver circuitry;
an analog-to-digital converter (ADC) that is coupled to the second mixer, the baseband processor, and the DPD circuitry; and
a switch that is substantially in parallel to at least a portion of the receiver circuitry between the power amplifier and the ADC, wherein the switch is actuated so as to provide an output from the power amplifier to the ADC during transmit periods of a TDD cycle, and wherein the switch is actuated so as to isolate the output from the ADC during receive periods of the TDD cycle, and wherein a second one of the pair of second mixers is coupled between the power amplifier and the switch.

6. The transceiver of claim 5, wherein the second portion of the receiver circuitry further comprises a filter that is coupled to the ADC.

7. The transceiver of claim 6, wherein the filter further comprises a first filter, and wherein the second portion of the receiver circuitry further comprises:
a duplexer that is coupled to the power amplifier;
a second filter that is coupled to the duplexer; and
an amplifier that is coupled between the second filter and the first one of the pair of second mixers.

8. A transceiver for TDD communications comprising:
a baseband processor;
a digital upconverter that is coupled the baseband processor;
DPD circuit that is coupled to the digital upconverter, wherein the DPD circuit receives an a first in-phase (I) signal and a first quadrature (Q) signal from the digital upconverter;
a first DAC that is coupled to the DPD circuitry so as to receive a second I signal;
a second DAC that is coupled to the DPD circuitry so as to receive a second Q signal;
a local oscillator;
a first mixer that is coupled to the first DAC, the second DAC, and the local oscillator, wherein the first mixer receives a third I signal from the first DAC and receives a third Q signal from the second DAC;
a power amplifier that is coupled to the mixer;
receiver circuitry that is couple to the power amplifier, wherein receiver circuitry includes a filter;
a second mixer that is coupled to the at least a portion of the receiver circuitry and the amplifier;
a first ADC that is coupled to the second mixer, the baseband processor, and the DPD circuitry, wherein the first ADC receives a fourth I signal from the second mixer;
a second ADC that is coupled to the second mixer, the baseband processor, and the DPD circuitry, wherein the second ADC receives a fourth Q signal from the second mixer, and wherein the filter that is coupled between the second mixer and the each of the first and second ADCs;
a digital downconverter that is coupled between each of the first and second ADCs and the baseband processor; and
a switch that is substantially in parallel to at least a portion of the receiver circuitry between the power amplifier and each of the first and second ADCs, wherein the switch is actuated so as to provide an output from the power amplifier to each of the first and second ADCs during transmit periods of a TDD cycle, and wherein the switch is actuated so as to isolate the output from each of the first and second ADCs during receive periods of the TDD cycle.

9. The transceiver of claim 8, wherein the switch further comprises:
a first switch that is coupled to the power amplifier and is coupled between at least a portion of the receiver circuitry and the second mixer; and a second switch that is coupled in parallel to the filter between the mixer and each of the first and second ADCs.

10. The transceiver of claim 9, wherein the filter further comprises a first filter, and wherein the receiver circuitry further comprises:
a duplexer that is coupled to the power amplifier;
a second filter that is coupled to the duplexer; and
an amplifier that is coupled between the second filter and the first switch.

11. A transceiver for TDD communications comprising:
a baseband processor;
a digital upconverter that is coupled the baseband processor;
DPD circuit that is coupled to the digital upconverter, wherein the DPD circuit receives an a first I signal and a first Q signal from the digital upconverter;
a first DAC that is coupled to the DPD circuitry so as to receive a second I signal;
a second DAC that is coupled to the DPD circuitry so as to receive a second Q signal;
a local oscillator;
a first mixer that is coupled to the first DAC, the second DAC, and the local oscillator, wherein the first mixer receives a third I signal from the first DAC and receives a third Q signal from the second DAC;
a power amplifier that is coupled to the mixer;
receiver circuitry that is couple to the power amplifier;
a pair of second mixers that are each coupled to the local oscillator, wherein a first one of the pair of second mixers is coupled between first and second portions of the receiver circuitry;
a first ADC that is coupled to the second mixer, the baseband processor, and the DPD circuitry, wherein the first ADC receives a fourth I signal from the second mixer;
a second ADC that is coupled to the second mixer, the baseband processor, and the DPD circuitry, wherein the second ADC receives a fourth Q signal from the second mixer;
a digital downconverter that is coupled between each of the first and second ADCs and the baseband processor; and
a switch that is substantially in parallel to at least a portion of the receiver circuitry between the power amplifier and each of the first and second ADCs, wherein the switch is actuated so as to provide an output from the power amplifier to each of the first and second ADCs during transmit periods of a TDD cycle, and wherein the switch is actuated so as to isolate the output from each of the first and second ADCs during receive periods of the TDD cycle, and wherein a second one of the pair of second mixers is coupled between the power amplifier and the switch.

12. The transceiver of claim 11, wherein the second portion of the receiver circuitry further comprises a filter that is coupled to each of the first and second ADCs.

13. The transceiver of claim 12, wherein the filter further comprises a first filter, and wherein the second portion of the receiver circuitry further comprises:
a duplexer that is coupled to the power amplifier;
a second filter that is coupled to the duplexer; and
an amplifier that is coupled between the second filter and the first one of the pair of second mixers.

* * * * *